United States Patent
Hayashi

(10) Patent No.: US 6,348,976 B1
(45) Date of Patent: Feb. 19, 2002

(54) IMAGE DATA TRANSFER METHOD AND MACHINE READABLE RECORDING MEDIUM WITH IMAGE ANALYSIS INTERMEDIATE DATA RECORDED THEREON

(75) Inventor: Akihito Hayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/087,500

(22) Filed: May 29, 1998

(30) Foreign Application Priority Data

Dec. 11, 1997 (JP) ............................................. 9-341317

(51) Int. Cl.⁷ ............................................. G06F 15/00
(52) U.S. Cl. ........................ 358/1.2; 358/1.15; 358/535
(58) Field of Search ........................ 358/1.2, 1.5, 1.12, 358/1.13, 1.14, 1.15, 406, 442, 519, 521, 524, 525, 535, 537; 347/40, 41

(56) References Cited

U.S. PATENT DOCUMENTS 5,642,202 A * 6/1997 Williams et al. ............ 358/406
5,912,683 A * 6/1999 Eade ........................... 347/40

FOREIGN PATENT DOCUMENTS

JP          6-161398        6/1994

* cited by examiner

Primary Examiner—Mark Wallerson
(74) Attorney, Agent, or Firm—Staas & Halsey LLP

(57) ABSTRACT

The present invention discloses a method of reducing intermediate data to provide very portable intermediate data, and keeping in balance loads on an analysis processor and a print processor. For this purpose, in an image data transfer method of the present invention, the analysis processor creates image analysis intermediate data including a matrix element of a transformation matrix for transformation of a position of each pixel of image data into an actual print position, and color information of the pixels arranged in the order in which the pixels of the image data are arranged, and transfers the image analysis intermediate data created in the analysis processor to the print processor. The present invention can be applied to transfer, when a certain processor requests a print processing-dedicated processor to print image data, the image data in, for example, a client server system.

11 Claims, 13 Drawing Sheets

ALGORITHM OF TRANSFORMATION
MATRIX [a b c d tx ty]

a, b ⟶ x- DIRECTIONAL DISTANCE (dx) OF PRINT AREA c, d ⟶ y- DIRECTIONAL DISTANCE (dy) OF PRINT AREA tx, ty ⟶ ORIGIN

IMAGE DATA TRANSFER METHOD AND MACHINE READABLE RECORDING MEDIUM WITH IMAGE ANALYSIS INTERMEDIATE DATA RECORDED THEREON

BACKGROUND OF THE INVENTION

1) Field of the Invention

The present invention relates to an image data transfer method of transferring, for printing image data analyzed by an analysis processor, the image data from the analysis processor to a print processor, and a machine readable recording medium with image analysis intermediate data recorded thereon, and in particular to a technique suitable to transfer, when a certain processor requests a print processing-dedicated processor to print image data, the image data in, for example, a client server system.

2) Description of the Related Art

In general, a method of printing image data by a processor includes stand-alone type processing shown in FIG. 10, and distributed processing shown in FIG. 11.

In the stand-alone type processing shown in FIG. 10, a common processor 100 is used for analysis processing and print processing of the image data. That is, the processor 100 includes an analysis processor 100a and a print processor 100b. The analysis processor 100a analyzes the image data to be printed to create intermediate data consisting of color data and coordinate values as will be described referring to FIG. 12. Further, the print processor 100b loads the intermediate data created in the analysis processor 100a into a bit map memory (not shown), and causes a printer (or setter [exposure apparatus]) 101 to print (output) a result of loading.

However, in the stand-alone type processing as described above, the entire processing of analyzing and printing the image data is performed in the common processor 100 so that the processor 100 is put under heavier load, resulting in a lower speed at which the image data is printed.

Hence, in recent years, there has been widely employed the distributed type (client server type) processing shown in FIG. 11, in which discrete processors 110, 111 are provided to perform analysis processing and print processing of image data. That is, in the distributed type processing, an analysis processor 110a of the processor 110 performs the same processing as that performed in the analysis processor 100a of FIG. 10, and a print processor 111a of the processor 111 performs the same processing as that performed in the print processor 100b in FIG. 10.

In this case, the intermediate data created in the analysis processor 110a of the processor 110 is transferred from the processor 110 to the processor 111 over a LAN 120, or is transferred to the processor 111 after being temporarily stored on a hard disk 130 in the processor 110. Alternatively, the intermediate data may be stored on a floppy disk (hereinafter often referred to as FPD) 140, and the FPD 140 may manually be brought to the processor 111. The processor 111 may read the transferred intermediate data from FPD 140.

As stated above, the analysis processing and the print processing are not performed in the common processor, but performed in the discrete processors 110, 111 in a distributed manner. It is thereby possible to efficiently perform the entire processing of analyzing and printing the image data.

Meanwhile, the intermediate data created in the analysis processor 110a of the processor 110 has, for example, a format (data structure) as shown in FIG. 12. FIG. 12 shows intermediate data which is created in the analysis processor 110a in order to magnify twice in length and width and print image data of 512×512 pixels including CMYK (Cyanogen, Magenta, Yellow, and Black).

In this case, the analysis processor 110a calculates, for each pixel, the intermediate data consisting of the color data (4 bytes) of the pixel, and the x and y coordinates (16 bytes) of a bottom left endpoint and a top right endpoint of the pixel by using a transformation matrix [a b c d tx ty] for transformation of a position of each pixel of the image data into an actual printing position. Therefore, since 512×512 combinations of the color data and the rectangular coordinate data are given, the analysis processor 110a creates the intermediate data having the size of 5 Mbytes (20 bytes× 512×512=5,242,880 bytes=5 Mbytes).

Here, in the transformation matrix, the matrix elements a, d specify scale factors in x and y direction, the matrix elements b, c are rotation elements in the x and y direction, and the matrix elements tx, ty are the x and y coordinates (parallel movement elements) of a position from which the printing must be started (a position of the origin of a print area). In the illustration shown in FIG. 12, the image data is magnified twice in length and width, and is printed starting with the origin of print area coordinates. Thus, the matrix elements a, d are set to twos, and b, c, tx, and ty are set to zeros. The transformation matrix transforms the image data of 512×512 pixels into image data of 1,024×1,024 pixels, which is printed in a predetermined print area.

However, in the conventional intermediate data shown in FIG. 12, the color data of the pixel and the rectangular coordinate data indicating a position at which the pixel is printed are paired for each pixel. Hence, an extremely large data size applies an excessively heavy load to the LAN 120 over which the intermediate data is transferred.

Further, when the intermediate data is stored on the hard disk 130 or the FPD 140, due to the extremely large data size thereof, the intermediate data occupies much of a memory capacity, and the entire intermediate data for one image data can not be stored on the single FPD 140.

In particular, it is necessary to analyze and transfer A3 or A2 size image data in a system for printing a newspaper, and so forth. In this case, the above problem becomes more pronounced since the intermediate data size becomes considerably large. It is difficult to transfer the intermediate data over a communication network such as LAN 120, or the recording medium such as FPD 140.

Even when the intermediate data is decreased in size to reduce the load applied to the communication network such as LAN 120, another problem is left. When the intermediate data having the format shown in FIG. 12 is transferred over the LAN 120, the analysis processor 110a to create the intermediate data is put under heavier load than that on the print processor 111a. Hence, intermediate data creation processing takes a longer time than that required by print processing.

Hence, as shown in FIG. 13, a period to wait for transfer of the intermediate data from the analysis processor 110a is inevitably generated in the print processor 111a. As a result, it is impossible to efficiently perform the analysis/print processing of the image data.

Further, the analysis processor 110a of the processor 110 must perform not only the intermediate data creation processing but also various other processing. Consequently, it is undesirable that the load on the analysis processor 110a increases due to only the intermediate data creation processing.

SUMMARY OF THE INVENTION

In view of the foregoing problems, it is an object of the present invention to provide an image data transfer method and a machine readable recording medium with image analysis intermediate data recorded thereon, in which an intermediate data format is improved to reduce intermediate data so as to provide very portable intermediate data, and keep in balance loads on an analysis processor and a print processor so as to efficiently perform analysis processing and print processing of image data.

According to the present invention, for achieving the above-mentioned objects, there is provided an image data transfer method of transferring, for printing image data analyzed by an analysis processor, the image data from the analysis processor to a print processor. The method includes the steps of creating, in the analysis processor, image analysis intermediate data containing a matrix element of a transformation matrix for transformation of a position of each pixel of the image data into an actual printing position, and color information of the pixels arranged in the order in which the pixels of the image data are arranged, and transferring the image analysis intermediate data created in the analysis processor to the print processor.

Further, the print processor finds, in the order in which the pixels of the image data are arranged, a print area of each pixel of the image data depending upon the matrix element of the transformation matrix in the image analysis intermediate data, and reads the color information of each pixel from the image analysis intermediate data to write the color information onto the print area.

Alternatively, the analysis processor may add to the image analysis intermediate data a format of the color information as sample format information, and the print processor may perform print processing according to the sample format information in the image analysis intermediate data.

Further, the analysis processor may add to the image analysis intermediate data the number of pixels per row of the image data, and the number of color information contained in the image analysis intermediate data, and the print processor may perform pixel loading processing by one row and calculation processing of a print start position of the next row depending upon the number of pixels per row in the image analysis intermediate data, and may repeatedly perform the pixel loading processing and the calculation processing according to the number of color information in the image analysis intermediate data.

Meanwhile, the image analysis intermediate data created in the analysis processor may be transferred to the print processor through storage on a machine readable recording medium, or may be transferred to the print processor over a communication network.

In the above-mentioned image data transfer method according to the present invention, the analysis processor creates the image analysis intermediate data containing both the matrix element of the transformation matrix and the color information of each pixel, and transfers the image analysis intermediate data to the print processor.

Therefore, since the intermediate data can be reduced, it is possible to efficiently store the intermediate data on the recording medium such as FPD, and reduce the load on the communication network when the intermediate data is transferred over the communication network.

In addition, though a calculation of a position at which each pixel is printed is conventionally made in the analysis processor, the calculation can be made in the print processor depending upon the intermediate data. It is thereby possible to keep in balance loads on the analysis processor and the print processor.

On the other hand, according to the present invention, there is provided a machine readable recording medium on which, for transferring image data analyzed by an analysis processor from the analysis processor to a print processor, image analysis intermediate data created from the image data in the analysis processor is recorded. In the machine readable recording medium, the image analysis intermediate data is recorded on a data file created on the recording medium. The data file has a matrix element data area containing a matrix element of a transformation matrix for transformation of a position of each pixel of the image data into an actual printing position in the print processor, and a color data area containing color information to be written on a print area of each pixel of the image data in the print processor. Further, the color information of the pixels of the image data are arranged in the color data area in the order in which the pixels of the image data are arranged.

In this case, the data file has a format data area containing sample format information used for posting a format of the color information to the print processor.

Further, the data file has a row pixel number data area containing the number of pixels per row of the image data, required to perform pixel loading processing by one row and calculation processing of a print start position of the next row in the print processor, and a count value data area in which the number of color information contained in the image analysis intermediate data is recorded to define the number of times the pixel loading processing and the calculation processing are repeated in the print processor.

On the above-mentioned machine readable recording medium according to the present invention, the image analysis intermediate data is recorded to have the format containing, at least, the matrix element of the transformation matrix and the color information of each pixel without any rectangular coordinate data indicating a position at which each pixel is printed. As a result, the size of the intermediate data can considerably be reduced unlike conventional intermediate data.

In addition, though a calculation of a position at which each pixel is printed is conventionally made in an analysis processor, the calculation can be made in the print processor depending upon the intermediate data. It is thereby possible to keep in balance loads on the analysis processor and the print processor.

As set forth above, it is possible to reduce the intermediate data transferred from the analysis processor to the print processor in the image data transfer method according to the present invention. It is thereby possible to efficiently store the intermediate data on the recording medium such as FPD, and reduce the load on a communication network when the intermediate data is transferred over the communication network. As a result, the intermediate data can be made easily portable.

In addition, though a calculation of a position at which each pixel is printed is conventionally made in an analysis processor, the calculation can be made in the print processor depending upon the intermediate data. It is thereby possible to keep in balance loads on the analysis processor and the print processor. Thus, in the print processor is generated no period to wait for transfer of the intermediate data from the analysis processor. As a result, it is possible to extremely efficiently perform analysis processing and print processing of the image data.

On the other hand, according to the machine readable recording medium with the image analysis intermediate data recorded thereon of the present invention, the intermediate data has no rectangular coordinate data indicating a position at which each pixel is printed. As a result, it is possible to considerably reduce the size of the intermediate data unlike conventional intermediate data so as to provide very portable intermediate data.

In addition, though a calculation of a position at which each pixel is printed is conventionally made in an analysis processor, the calculation can be made in the print processor depending upon the intermediate data. It is thereby possible to keep in balance loads on the analysis processor and the print processor. Thus, in the print processor is generated no period to wait for transfer of the intermediate data from the analysis processor. As a result, it is possible to extremely efficiently perform analysis processing and print processing of the image data.

DESCRIPTION OF THE PREFERRED EMBODIMENTS

Figure 1:
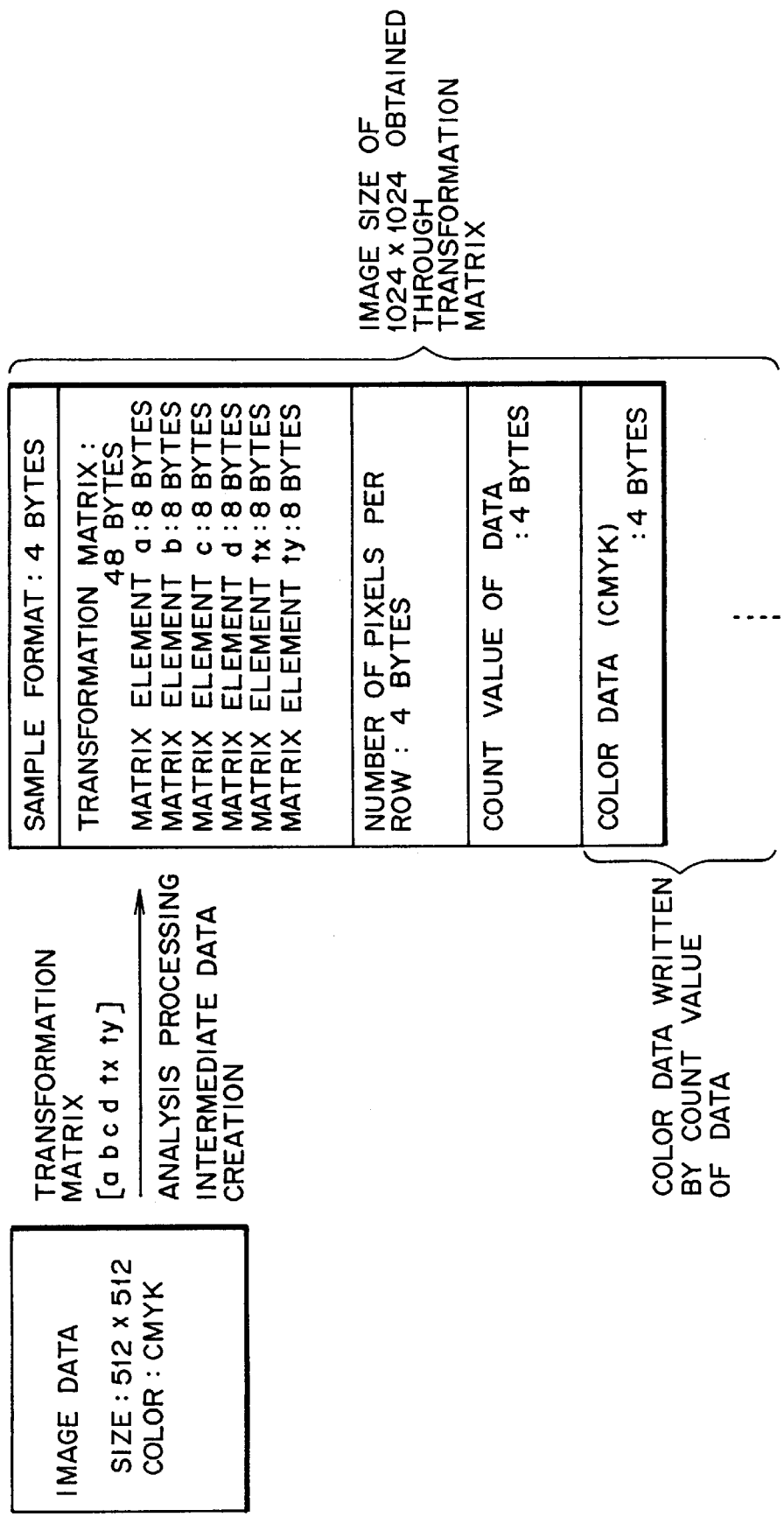
FIG. 1 is a diagram for explaining a basic structure of image analysis intermediate data in an embodiment of the present invention.

A description will now be given of embodiments of the present invention referring to the drawings.

Figure 2:
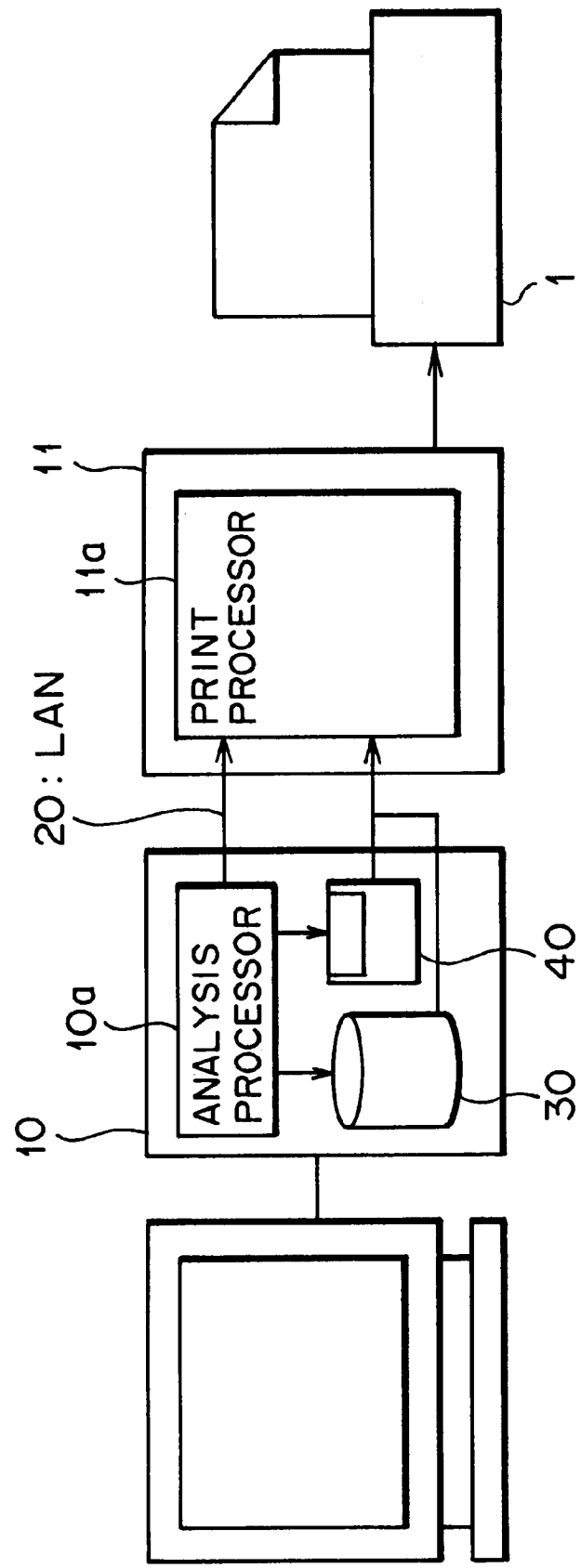
FIG. 2 is a block diagram showing a configuration of a print system to which the embodiment of the present invention is applied.
Figure 11:
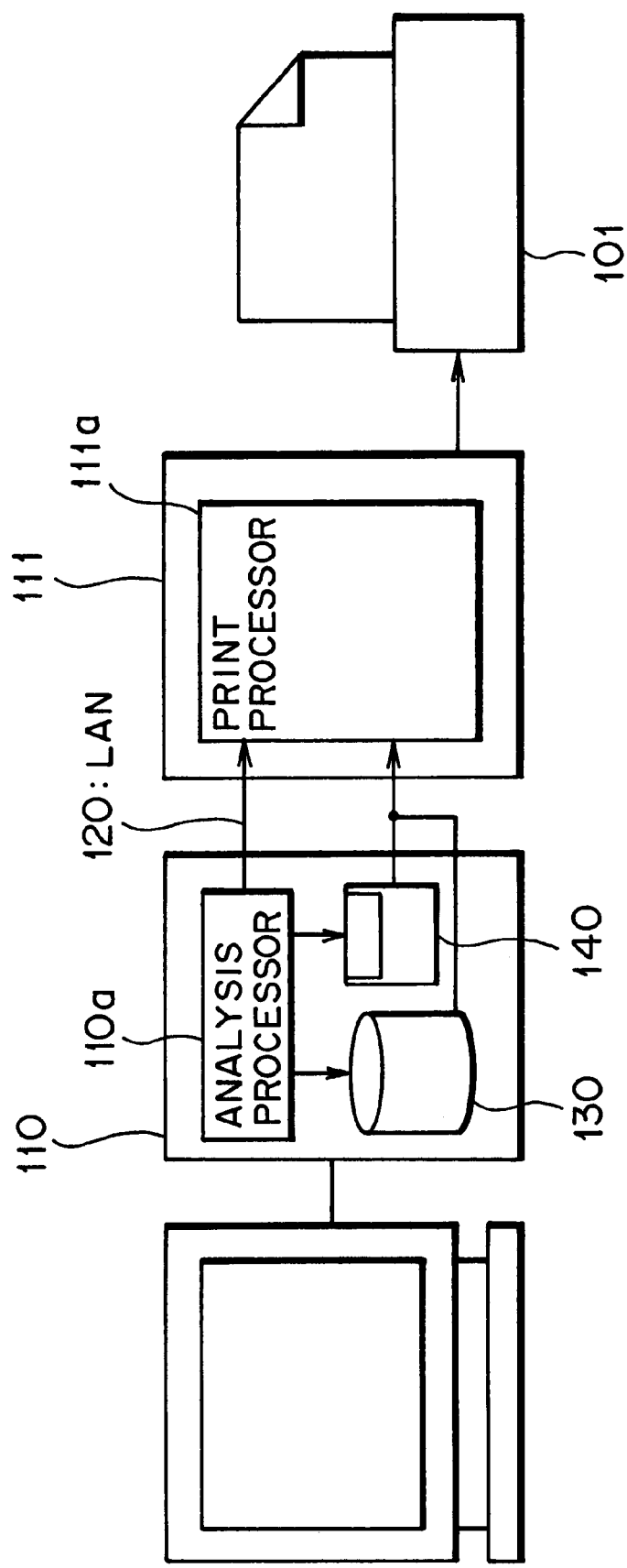
FIG. 11 is a block diagram for explaining a general (distributed type) method of printing image data by a processor.

[A] Description of Basic Structure of Image Analysis Intermediate Data in the Embodiment of the Invention A print system to which an embodiment of the present invention is applied is basically configured as in the distributed type system shown in FIG. 11. That is, as shown in FIG. 2, in the print system according to the embodiment, distributed type (client server type) processing is employed in which discrete processors 10, 11 are used to perform analysis processing and print processing of image data, and the processors 10, 11 are interconnected through a LAN (communication network) 20.

However, in the embodiment, an analysis processor 10a of the processor 10 analyzes image data having a specific format such as PostScript, and creates image analysis intermediate data having a basic structure as shown in FIG. 1 from the image data so as to transfer the image data to a print processor 11a.

Further, the intermediate data created in the analysis processor 10a is transferred to a print processor 11a of the processor 11 over the LAN 20 or by an FPD 40. As will be described infra, the print processor 11a loads the image data into a bit map memory (not shown) while transforming a position of each pixel of the image data into an actual printing position depending upon the intermediate data, and causes a printer (or setter [exposure apparatus]) 1 to print (output) a result of loading.

Meanwhile, a hard disk 30 is built in the processor 10 so that the intermediate data created in the analysis processor 10a may temporarily be stored on the hard disk 30, and may thereafter be transferred to the processor 11.

A description will now be given of the basic structure (format) of the image analysis intermediate data created in the analysis processor 10a of the processor 10 in the embodiment referring to FIG. 1.

FIG. 1 shows the basic structure of the image analysis intermediate data created in the analysis processor 10a when image data of 512×512 pixels including CMYK (Cyanogen, Magenta, Yellow, and Black) is printed in a predetermined print area at predetermined magnification in length and width.

As shown in FIG. 1, the image analysis intermediate data created in the analysis processor 10a of the embodiment contains i) sample format (4 bytes), ii) matrix elements of a transformation matrix (48 bytes), iii) the number of pixels per row (4 bytes), iv) count value of data (4 bytes), and v) color data of each pixel (4 bytes×the count value of data).

i) Sample format (4 bytes) is information about a format (such as monochrome, RGB, CMYK, and CMY) of the color data of each pixel contained in the intermediate data, and the information is used to post the format of the color data to the print processor 11a.

ii) Matrix elements of the transformation matrix (48 bytes) are used by the print processor 11a to transform the position of each pixel of the image data into the actual printing position. Six matrix elements a, b, c, d, tx, and ty are provided as in the above transformation matrix. Each of the matrix elements is set to 8 bytes so that a total amount of data of the six matrix elements is 48 bytes. Meanwhile, as stated above, the matrix elements a, d specify scale factors in x and y direction, the matrix elements b, c are rotation elements in the x and y direction, and the matrix elements tx, ty are x, y coordinates (parallel movement elements) of a position from which printing must be started (a position of the origin of a print area).

iii) The number of pixels per row in image data (4 bytes) is required to perform pixel loading processing by one row and calculation processing of a print start position of the next row in the print processor 11a, as will be described infra.

Since the image data of 512×512 pixels is employed in the embodiment, the number of pixels is naturally set to 512.

iv) Count value of data (4 bytes) is the number of color data (color information) contained in the image analysis intermediate data, that is, the number of pixels with their color data added to the intermediate data among pixels processed in the analysis processor 10a. As will be described infra, the count value is used to specify the number of times the pixel loading processing and the calculation processing are repeated in the print processor 11a. As will be described in the first embodiment, when the intermediate data is created for each row, the count value is set to 512. Further, as will be described in the second embodiment, when intermediate data having color data of all the pixels is created, the count value is set to 512×512.

v) Color data of each pixel (4 bytes×the count value of data) is information of color to be written on a print area of each pixel of the image data in the print processor 11a. The color data are arranged in the order in which the pixels of the image data are arranged.

When the above image analysis intermediate data is created for each row as will be described in the first embodiment, the intermediate data in a single row has the size of 2,108 bytes (4+48+4+4+4×512=2,108 bytes) so that intermediate data in 512 rows has the size of 1 Mbyte+30 Kbytes (2,108×512=1,079,296 bytes=1 Mbyte+30 Kbytes).

Further, when the above image analysis intermediate data is created to contain the color data of all the pixels of the image data as will be described in the second embodiment, the intermediate data has the size of 1 Mbyte (4+48+4+4+ 4×512×512=1,048,636 bytes≈1 Mbyte).

Figure 12:
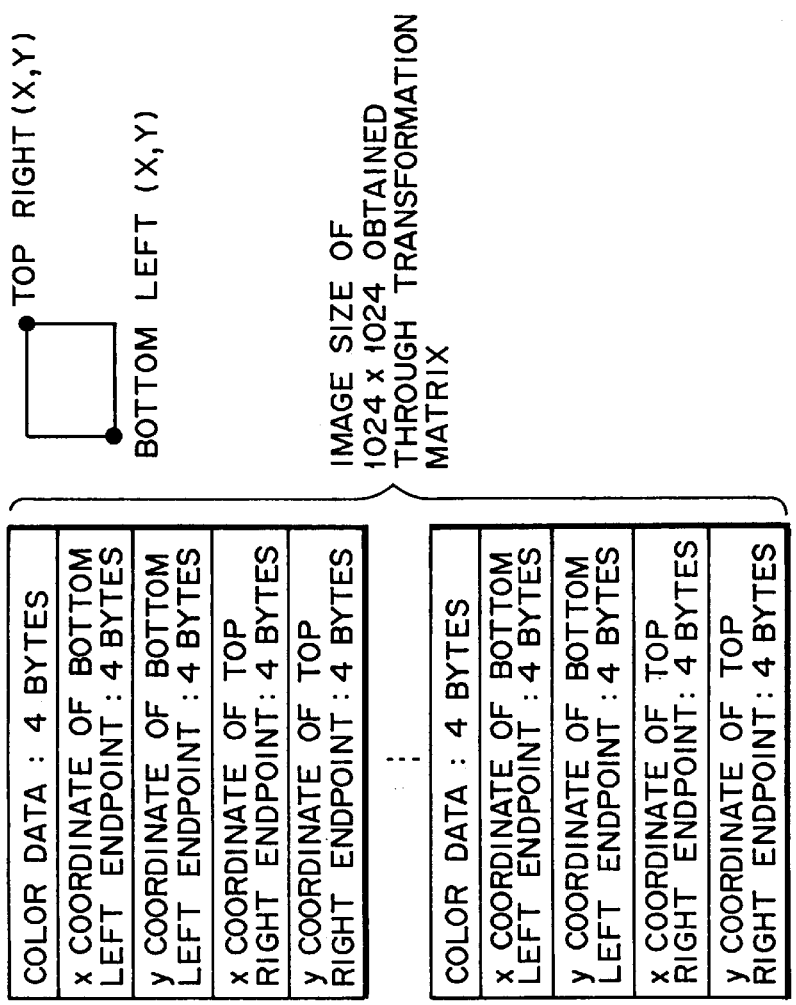
FIG. 12 is a diagram for explaining a structure (format) of conventional image analysis intermediate data.
Figure 13:
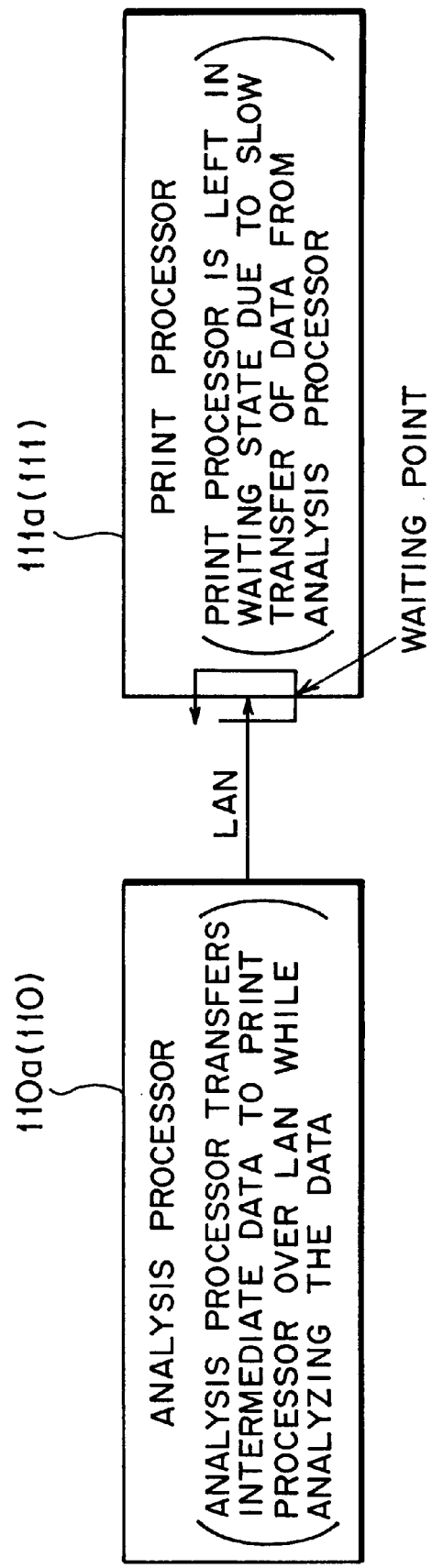
FIG. 13 is a diagram for explaining a drawback to the operation of a print processor when a conventional image transfer (intermediate data format) method is employed.

By creating the image analysis intermediate data having the structure as shown in FIG. 1, it is possible to reduce both the sizes of the intermediate data in the first and second embodiments to about one fifth of the size of the conventional image analysis intermediate data shown in FIG. 12.

As shown in FIG. 2, the above image analysis intermediate data is transferred to the print processor 11a from the analysis processor 10a over the LAN 20, or is transferred to the print processor 11a from the analysis processor 10a while being stored on the FPD 40, thereafter being read into the print processor 11a. In some cases, the image analysis intermediate data may be stored on the hard disk 30 or an unillustrated storage portion such as ROM, or RAM.

When the image analysis intermediate data in the embodiment is recorded and stored on a recording medium (machine readable recording medium) such as FPD 40, or storage portion, the image analysis intermediate data is recorded on a data file 50 created on the recording medium as shown in FIG. 1.

The data file 50 has a format data area 50a, a matrix element data area 50b, a row pixel number data area 50c, a count value data area 50d, and a color data area 50e.

Further, i) the sample format (4 bytes) is recorded in the format data area 50a, ii) the matrix elements of a transformation matrix (48 bytes) are in the matrix element data area 50b, iii) the number of pixels per row (4 bytes) is in the row pixel number data area 50c, iv) the count value of data (4 bytes) is in the count value data area 50d, and v) the color data of each pixel (4 bytes × the count value of data) is in the color data area 50e.

In the embodiment, the image analysis intermediate data has the above structure. Thus, it is possible to find a position of the next pixel according to the transformation matrix in the print processor 11a, and eliminate the need for adding to the intermediate data rectangular coordinate data indicating a position at which the pixel is printed.

Therefore, the size of the intermediate data can considerably be reduced unlike conventional intermediate data. Hence, the intermediate data can more smoothly be transmitted over the communication network such as LAN 20, and can more easily be stored on the recording medium such as FPD 40. As a result, the image analysis intermediate data can be made very portable.

Further, a position at which each pixel is printed is calculated depending upon the intermediate data (transformation matrix) in the print processor 11a as will be described infra, thereby reducing the load on the analysis processor 10a. In general, the print processing-dedicated processor 11 including the print processor 11a has higher performance than that of the processor 10. Thus, even when an additional calculation is made to find the position at which each pixel is printed, no problem is caused in view of the load on the print processor 11a.

If anything, it is possible to keep in balance the loads on the analysis processor 10a and the print processor 11a since the print processor 11a has the function of calculating the position at which each pixel is printed. Hence, in the print processor 11a is generated no period to wait for transfer of the intermediate data from the analysis processor 10a. As a result, it is possible to extremely efficiently perform analysis processing and print processing of the image data.

Further, the number of pixels per row and the count value of image data transmitted from the analysis processor 10a are added to the image analysis intermediate data. Therefore, in the print processor 11a, it is possible to decide, depending upon the number of pixels per row, how many pixels must be processed before movement to the next row, and grasp the size of the image data to be printed.

Consequently, it is possible to grasp the size of the intermediate data from the analysis processor 10a. Therefore, it is possible to prevent the print processor 11a from erroneously reading excessive data, or skipping necessary data, thereby simplifying a data reading portion of the print processor 11a.

Further, as will be described infra, in the print processor 11a, it is possible to grasp an ending position of each row depending upon the number of pixels per row, and grasp a y-directional printing position of the first pixel in the next row depending upon the parallel movement element ty of the transformation matrix. Besides, it is possible to sequentially calculate coordinates of a position at which an adjacent pixel is printed simply by repeatedly adding the matrix elements a to d to the coordinates of each pixel. Therefore, in the print processor 11a, it is possible to extremely easily perform the calculation processing of the position at which each pixel is printed.

Subsequently, a more specific description will be given of the image data transfer method and the structure of the image analysis intermediate data referring to FIGS. 3 to 9.

[B] Description of First Embodiment

Figure 3:
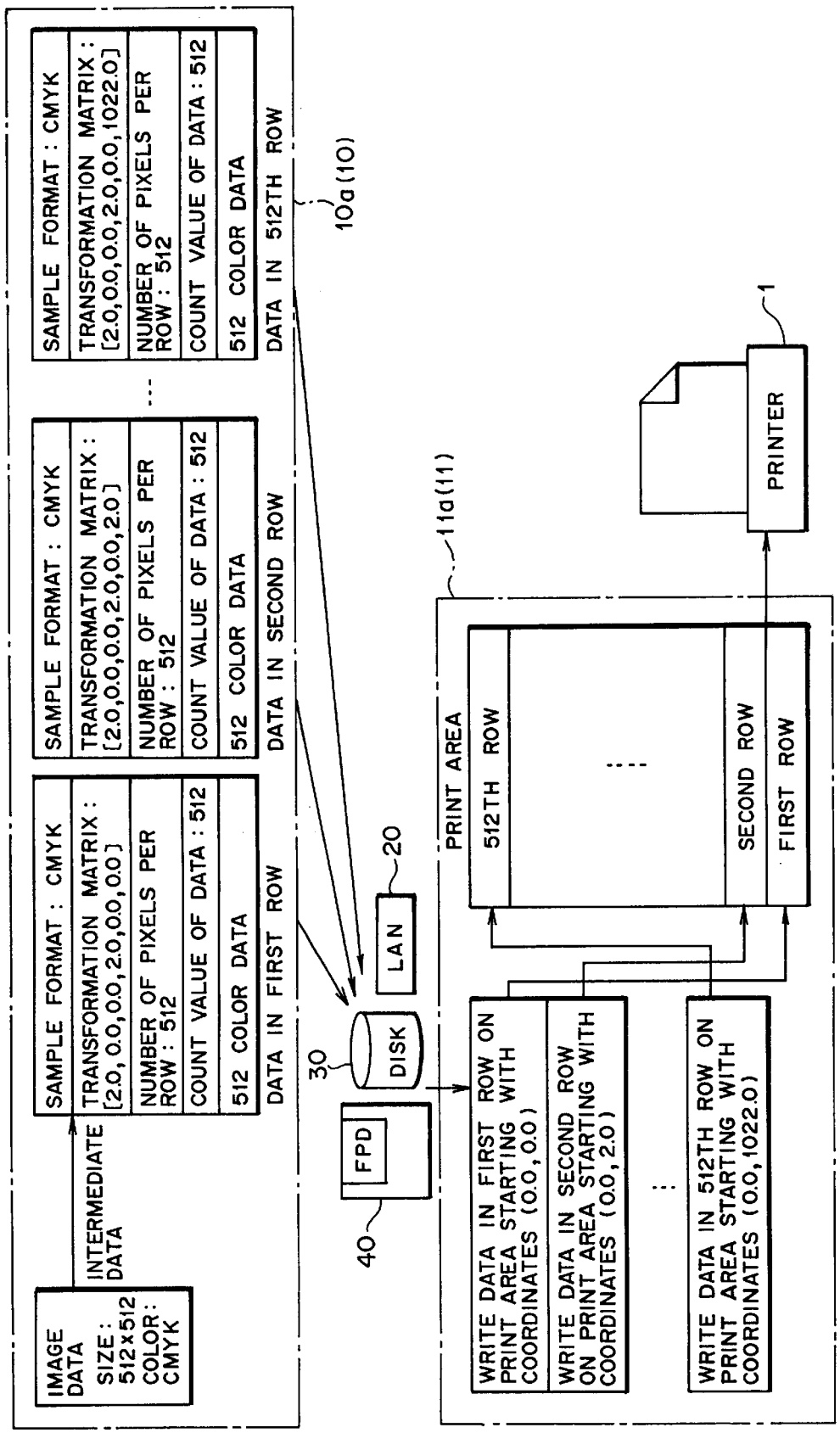
FIG. 3 is a diagram for explaining an image data transfer method and a structure (format) of image analysis intermediate data according to the first embodiment of the present invention.

The first embodiment will be described with reference to a case where image data of 512×512 pixels including CMYK is magnified twice in length and width, and is thereafter printed. In the first embodiment, as shown in FIG. 3, image analysis intermediate data is created for each row of image data in the analysis processor 10a, and is transmitted to the print processor 11a.

In the first embodiment, as in the illustration shown in FIG. 12, the image data is magnified twice in length and width, and is printed starting with the origin of print area coordinates. Thus, as shown in FIG. 3, in intermediate data in the first row, matrix elements a, d of a transformation matrix are set to twos, and matrix elements b, c, tx, and ty are set to zeros. In addition, in the intermediate data in the first row, a sample format is set to CMYK, the number of pixels per row is 512, a count value of data is 512, and color data in a single row, that is, the 512 color data are set in the order in which the pixels are arranged.

All the intermediate data in the first to 512th rows are identical in the sample format, the matrix elements a to d, and tx, the number of pixels per row, and the count value of data. Thus, the predetermined values are transmitted for each intermediate data. The matrix element (y-directional parallel movement element) ty of the transformation matrix, however, is set to a different value for each row. In the embodiment, the image data is magnified twice in length and width so that the parallel movement element ty is incremented by two with every increase of one row.

As described above, the image analysis intermediate data created for each row can be transferred from the analysis processor 10a to the print processor 11a over the LAN 20, or through storage on the hard disk 30 or the FPD 40.

Subsequently, the print processor 11a writes 512 color data in the first row onto a print area (bit map memory) in the x direction from the coordinates (0.0, 0.0) in the order in which the pixels are arranged. Similarly, color data in the second row are written starting with the coordinates (0.0., 2.0), color data in the third row are written starting with the coordinates (0.0, 4.0), . . . , and color data in the 512th row are finally written starting with the coordinates (0.0, 1022.0). Thereafter, the data written onto the print area are printed on the printer (or setter) 1. In such a manner, the image data of 512×512 pixels can be transformed into image data of 1,024×1,024 pixels, which is printed in a predetermined print area.

Next, a description will be given of a procedure (processing sequence) for creating the intermediate data in the analysis processor 10a in the first embodiment with reference to the flowchart (Steps S11 to S16) shown in FIG. 4. A further description will be given of a procedure (processing sequence) for print processing in the print processor 11a in the first embodiment with reference to the flowchart (Steps S21 to S26) shown in FIG. 5.

Figure 4:
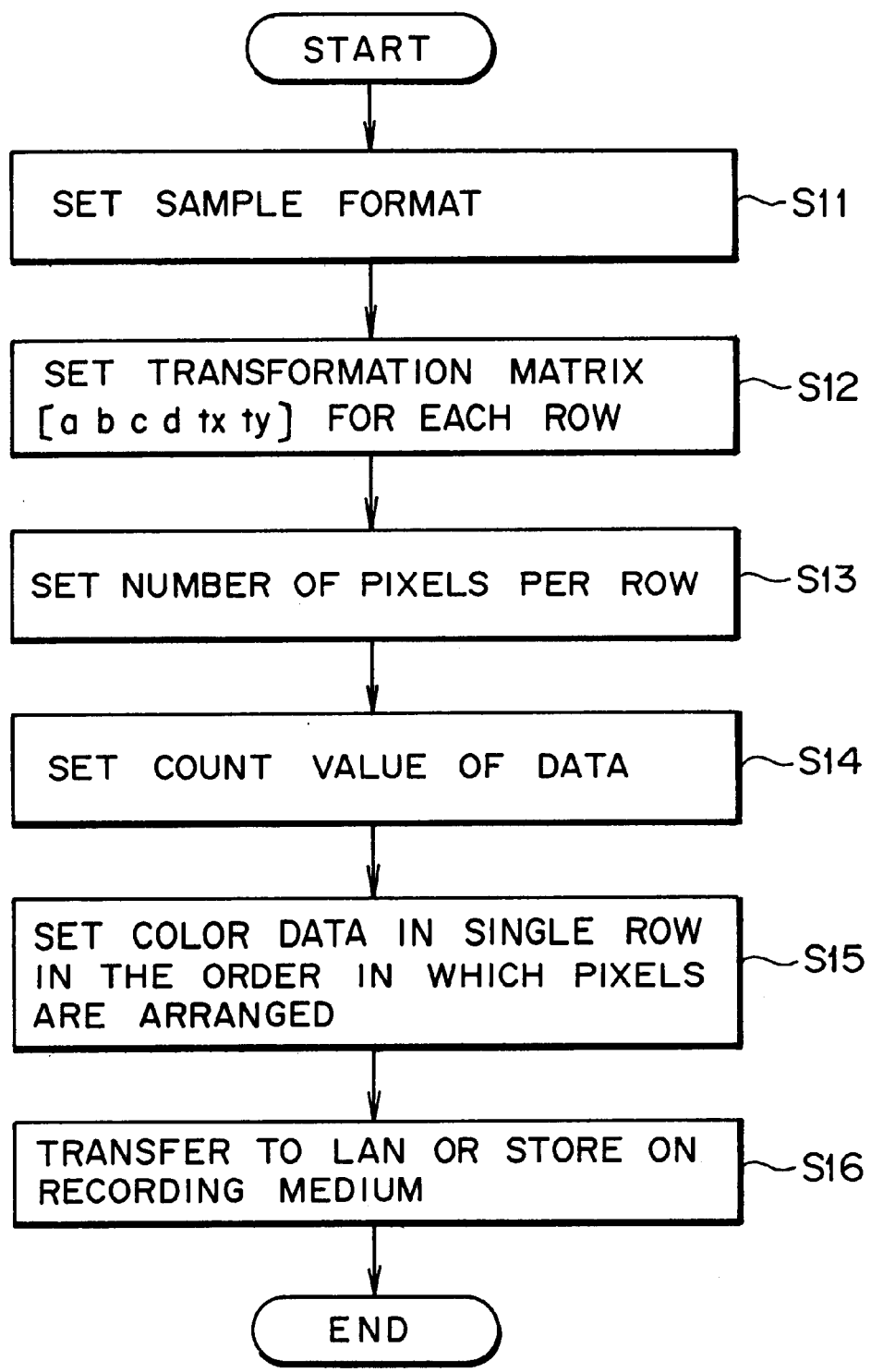
FIG. 4 is a flowchart for explaining a procedure for creating intermediate data in an analysis processor in the first embodiment.

Initially, as shown in FIG. 4, in the analysis processor 10a, the sample format of the intermediate data is set to the CMYK (Step S11).

Subsequently, a transformation matrix [a b c d tx ty] for the first row is set to [2.0 0.0 0.0 2.0 0.0 0.0]. As set forth above, in transformation matrixes for the second row and later, only the y-directional parallel movement element ty is changed. That is, 2.0 is written as the ty in intermediate data in the second row, 4.0 is written as the ty in intermediate data in the third row, . . . , and 1022.0 is written as the ty in intermediate data in the 512th row (Step S12). The parallel movement elements (tx, ty) set in the intermediate data in each row serve as the coordinates indicating a head position from which each row is to be printed.

Next, the number of pixels per row is set to 512 (Step S13), and the count value of data to be transmitted (the number of color data added to the intermediate data) is set to 512 (Step S14). Further, as color data, the CMYK data about the 512 pixels forming the row are set in the order in which the pixels are arranged (Step S15).

The intermediate data created in the above manner is transmitted to the print processor 11a (the processor 11) over the LAN 20, or is stored on the specified recording medium (the hard disk 30 or the FPD 40) (Step S16).

Figure 5:
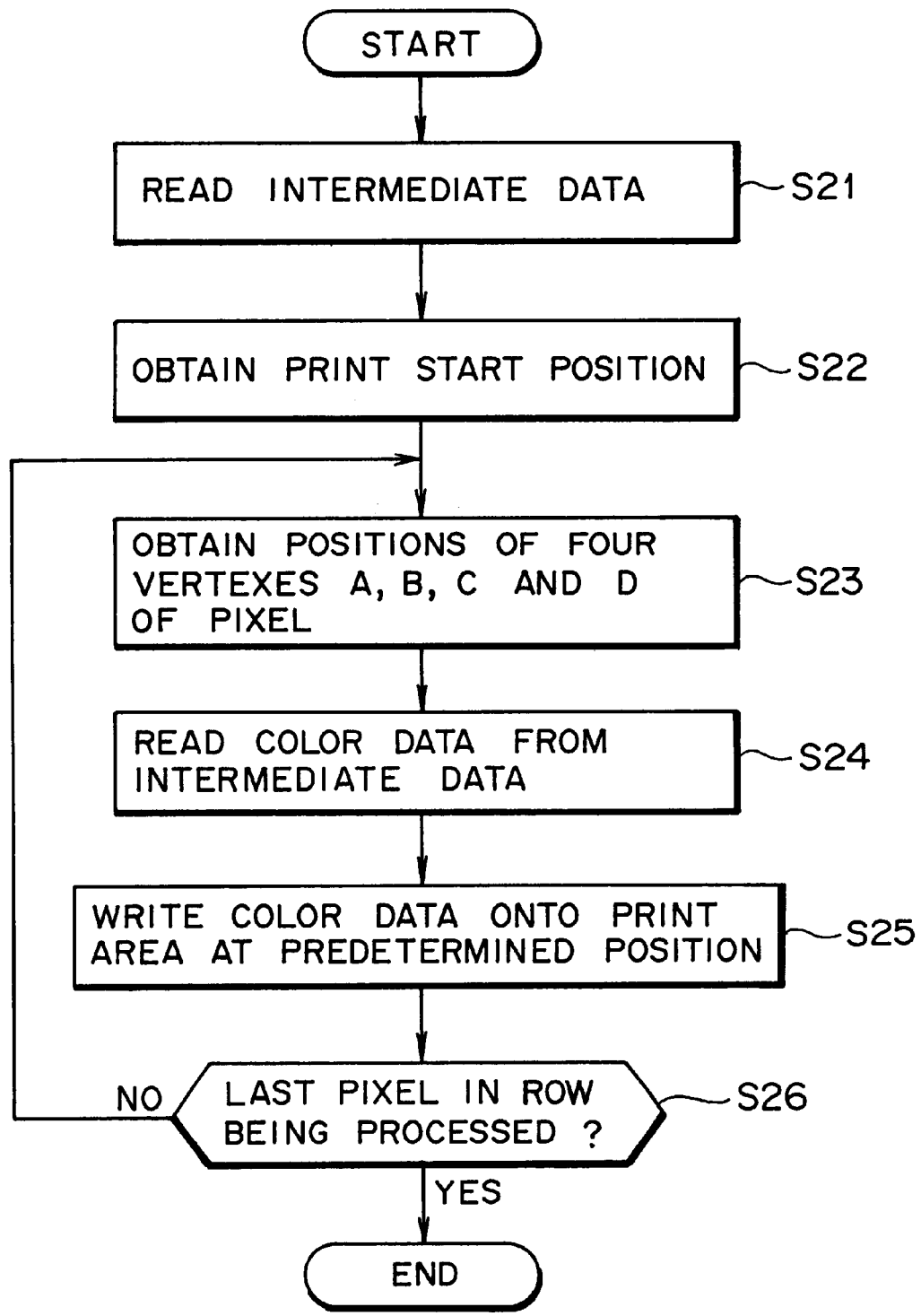
FIG. 5 is a flowchart for explaining a procedure for print processing in a print processor in the first embodiment.

On the other hand, as shown in FIG. 5, the print processor 11a initially receives the intermediate data from the LAN 20, or reads the intermediate data from the recording medium such as hard disk 30, and FPD 40 (Step S21), thereby obtaining the parallel movement elements (tx, ty) of the transformation matrix as the coordinates of the print start position (Step S22).

Figure 6:
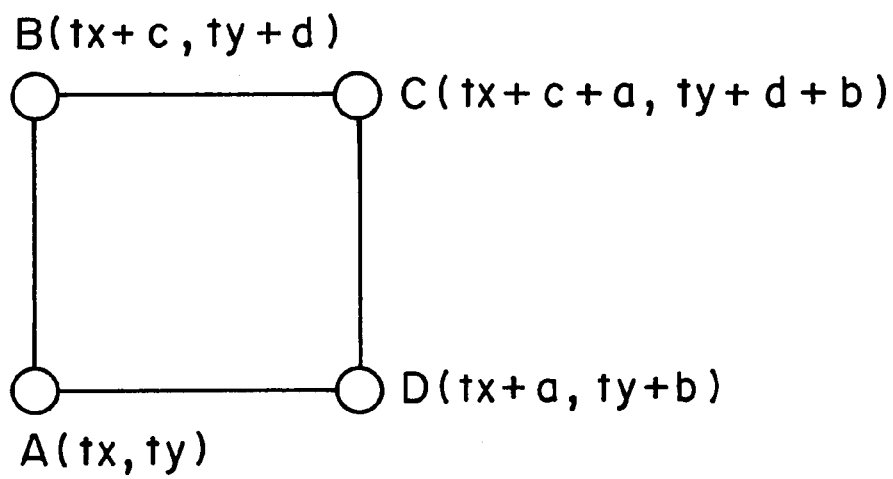
FIG. 6 is a diagram for explaining a method of calculating positions of vertexes of each pixel through a transformation matrix.

As shown in FIG. 6, the print processor 11a obtains positions of four vertexes A (tx, ty), B (tx+c, ty+d), C (tx+c+a, ty+d+b), and D (tx+a, ty+b) of one pixel depending upon the matrix elements a to d, tx, and ty of the transformation matrix (Step S23). Further, the print processor 11a reads the color data (CMYK) corresponding to the pixel from the intermediate data (Step S24), and writes the color data obtained in Step S24 onto the print area (bit map memory) in a rectangular area having the vertexes obtained in Step S23 (Step S25).

It is decided whether or not the pixel whose color data has been written is the last pixel (the 512th pixel) in a row being processed (Step S26). If the last pixel (in the case of YES), the operation is ended. Otherwise, if not the last pixel (in the case of NO), the operation returns to Step S23 to repeatedly perform the same processing.

However, in order to calculate positions of four vertexes A, B, C, and D of the nth pixel (n=2 to 512) in Step S23, two vertexes C and D of the (n−1)th pixel obtained in the preceding processing are respectively replaced by the two vertexes A and B of the nth pixel serving as a candidate for the current processing, thereafter calculating the remaining two vertexes C, D of the nth pixel.

In the first embodiment, according to the above procedure, the 512 color data in each row are written onto the print area (bit map memory) in the x direction from the coordinates (tx, ty) in the order in which the pixels are arranged.

As set forth above, according to the first embodiment of the present invention, the position of the next pixel can be found in the print processor 11a through the transformation matrix. Hence, it is not necessary to add to the intermediate data rectangular coordinate data indicating a position at which the pixel is printed.

Therefore, the size of the intermediate data can considerably be reduced unlike conventional intermediate data. Hence, the intermediate data can more smoothly be transmitted over the communication network such as LAN 20, and can more easily be stored on the recording medium such as FPD 40. As a result, the image analysis intermediate data can be made very portable.

Further, a position at which each pixel is printed is calculated depending upon the transformation matrix in the print processor 11a, thereby reducing the load on the analysis processor 10a. Thus, it is possible to keep in balance the loads on the analysis processor 10a and the print processor 11a. As a result, it is possible to extremely efficiently perform the analysis processing and the print processing of the image data.

Further, in the print processor 11a, depending upon the number of pixels per row in the image analysis intermediate data, it is possible to decide how many pixels must be processed before movement to the next row, and grasp the size of the image data to be printed depending upon the count value in the image analysis intermediate data.

Consequently, it is possible to grasp the size of the intermediate data from the analysis processor 10a.

Therefore, it is possible to prevent the print processor 11a from erroneously reading excessive data, or skipping necessary data, thereby simplifying a data reading portion of the print processor 11a.

Further, in the print processor 11a, it is possible to grasp the ending position of each row depending upon the number of pixels per row, and grasp the y-directional printing position of the first pixel in the next row depending upon the parallel movement element ty of the transformation matrix. Besides, as described above with reference to Step S23 of FIG. 5, it is possible to sequentially calculate coordinates of a position at which an adjacent pixel is printed simply by repeatedly adding the matrix elements a to d to coordinates of each pixel. Consequently, the print processor 11a can perform extremely simplified calculation processing of the position at which each pixel is printed, resulting in efficient processing of the intermediate data.

[C] Description of Second Embodiment

Figure 7:
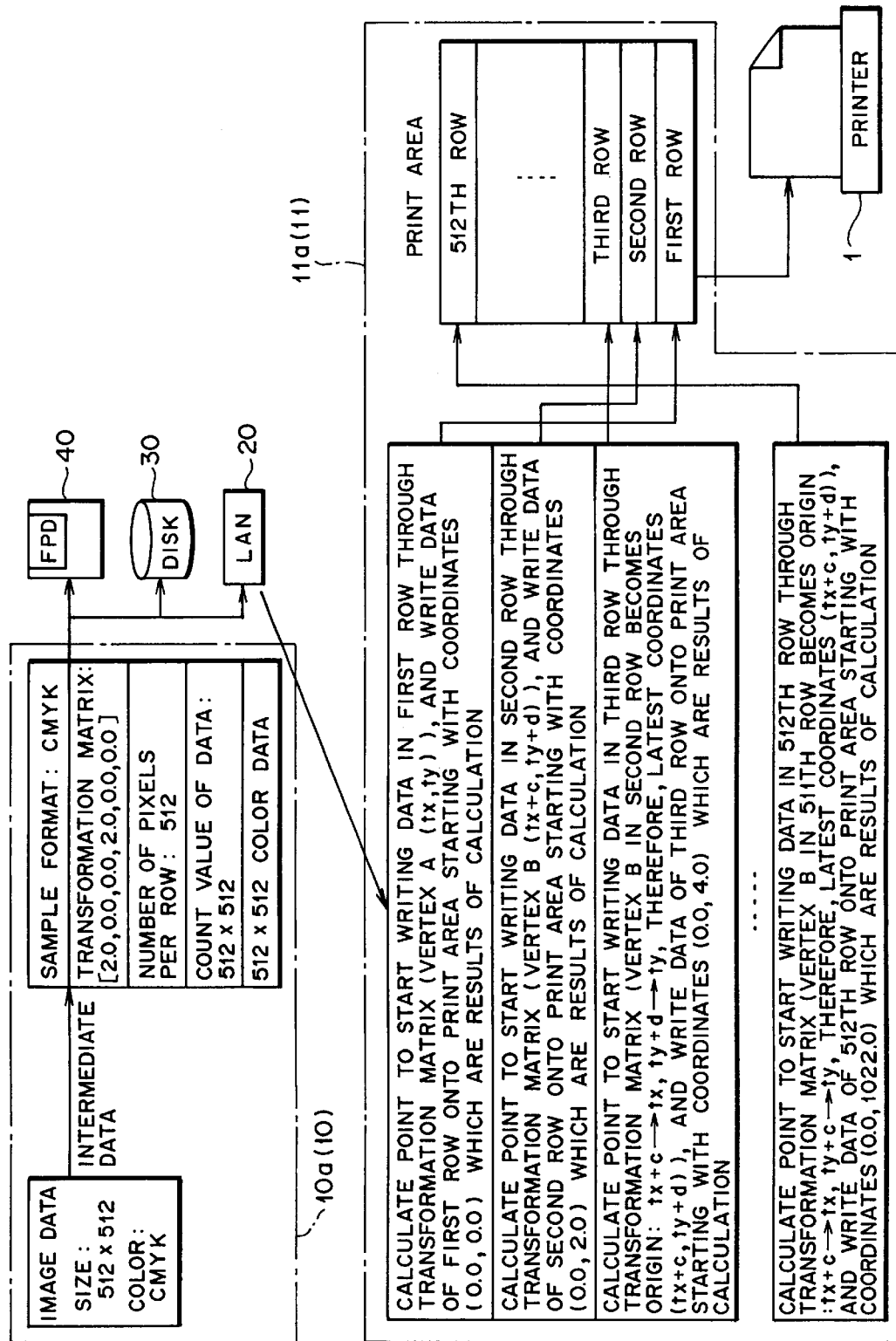
FIG. 7 is a diagram for explaining an image data transfer method and a structure (format) of image analysis intermediate data according to the second embodiment of the present invention.

The second embodiment will be described with reference to a case where image data of 512×512 pixels including CMYK is magnified twice in length and width, and is printed. In the second embodiment, as shown in FIG. 7, an analysis processor 10a creates image analysis intermediate data containing color data of all pixels of the image data, and transfers the intermediate data containing the color data of all the pixels to a print processor 11a at the same time.

In the second embodiment, as in the illustration shown in FIG. 12, the image data is magnified twice in length and width, and is printed starting with the origin of print area coordinates. Thus, as shown in FIG. 7, in the intermediate data, matrix elements a, d of a transformation matrix are set to twos, and b, c, tx, and ty are set to zeros. In addition, in the intermediate data, a sample format is set to CMYK, the number of pixels per row is 512, a count value of data is 512×512=262,144 (the total number of pixels), and color data of all the pixels, that is, the 262,144 color data are set in the order in which the pixels are arranged.

The image analysis intermediate data created in the above manner can be transferred from the analysis processor 10a to the print processor 11a over the LAN 20, or through storage on a hard disk 30 or an FPD 40.

Subsequently, the print processor 11a calculates a print start point A (see FIG. 6) of color data in the first row through the transformation matrix, and writes 512 color data in the first row onto a print area (bit map memory) in the x direction from the start point A (0.0, 0.0) in the order in which pixels are arranged.

Similarly, the print processor 11a calculates a print start point (a vertex B of the first pixel in the first row) of color data in the second row through the transformation matrix to write the color data starting with the start point (0.0., 2.0), calculates a print start point (a vertex B of the first pixel in the second row) of color data in the third row through the transformation matrix to write the color data starting with the start point (0.0., 4.0), . . . , and calculates a print start point (a vertex B of the first pixel in the 511th row) of color data in the 512 row through the transformation matrix to write the color data starting with the start point (0.0, 1022.0).

Thereafter, the data written onto the print area are printed on a printer (or setter) 1. In such a manner, the image data of 512×512 can be transformed into image data of 1,024× 1,024, and can be printed in a predetermined print area.

Next, a description will be given of a procedure (processing sequence) for creating the intermediate data in the analysis processor 10a in the second embodiment with reference to the flowchart (Steps S31 to S36) shown in FIG. 8. A further description will be given of a procedure (processing sequence) for print processing in the print processor 11a in the second embodiment with reference to the flowchart (Steps S41 to S48) shown in FIG. 9.

Figure 8:
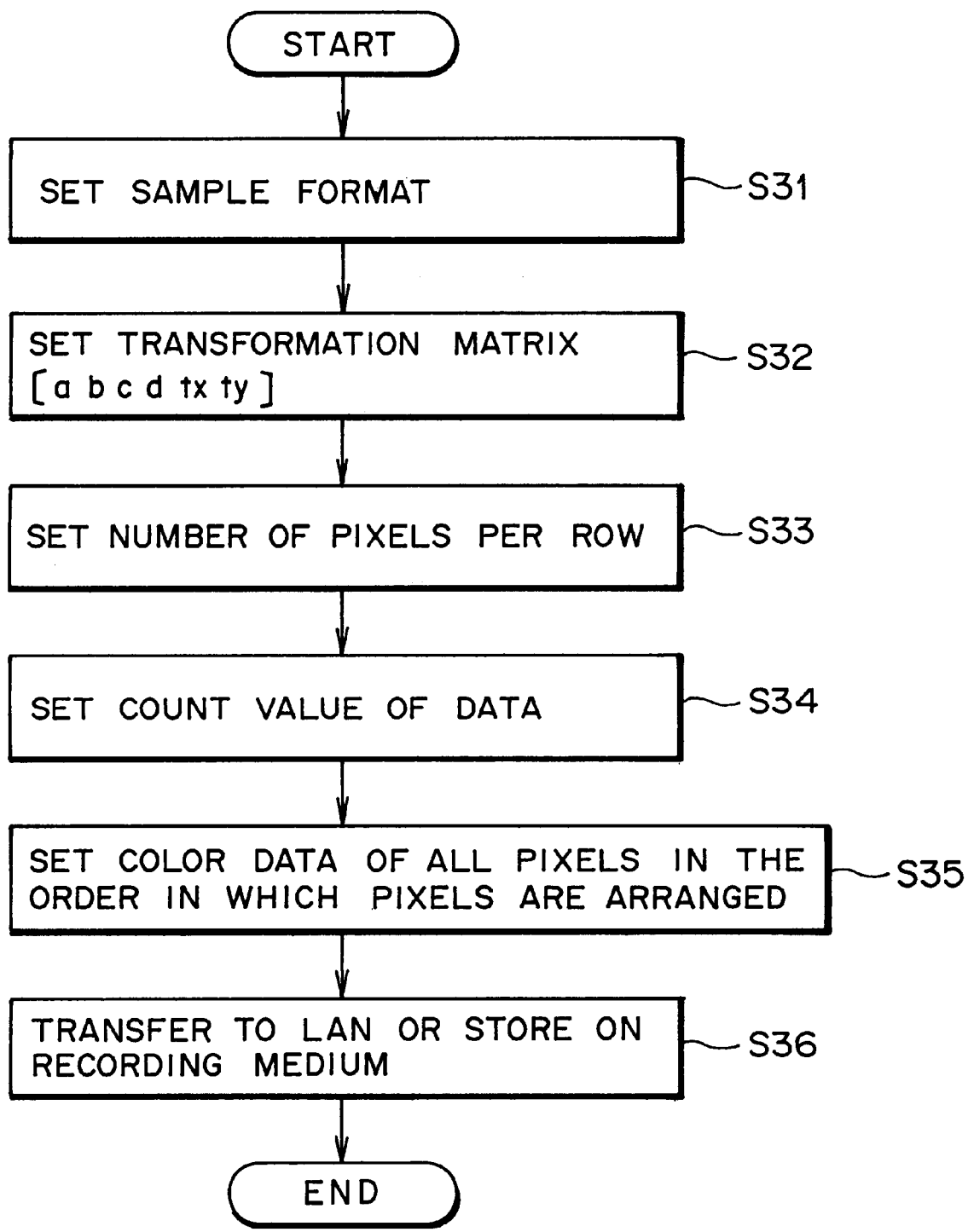
FIG. 8 is a flowchart for explaining a procedure for creating intermediate data in an analysis processor in the second embodiment.

Initially, as shown in FIG. 8, in the analysis processor 10a, the sample format of the intermediate data is set to the CMYK (Step S31), and the transformation matrix [a b c d tx ty] is set to [2.0 0.0 0.0 2.0 0.0 0.0] (Step S32).

Subsequently, the number of pixels per row is set to 512 (Step S33), and the count value of data to be transmitted (the number of color data added to the intermediate data) is set to 512×512=262,144 (the total number of pixels) (Step S34). Further, as color data, the CMYK data about the 262,144 pixels forming the image data are set in the order in which the pixels are arranged (Step S35).

The intermediate data created in the above manner is transmitted to the print processor 11a (the processor 11) over the LAN 20, or stored on the specified recording medium (the hard disk 30 or the FPD 40) (Step S36).

Figure 9:
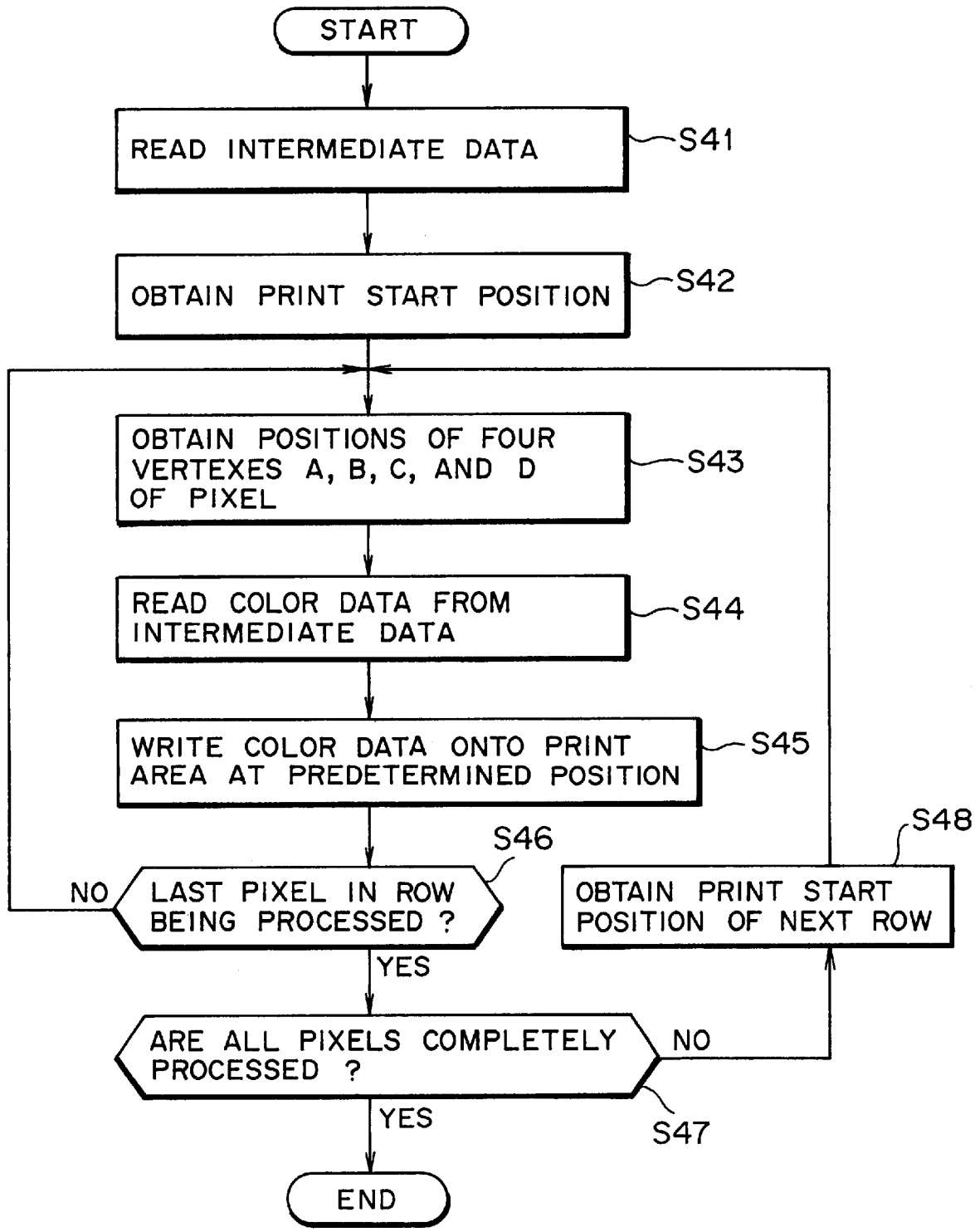
FIG. 9 is a flowchart for explaining a procedure for print processing in a print processor in the second embodiment.
Figure 10:
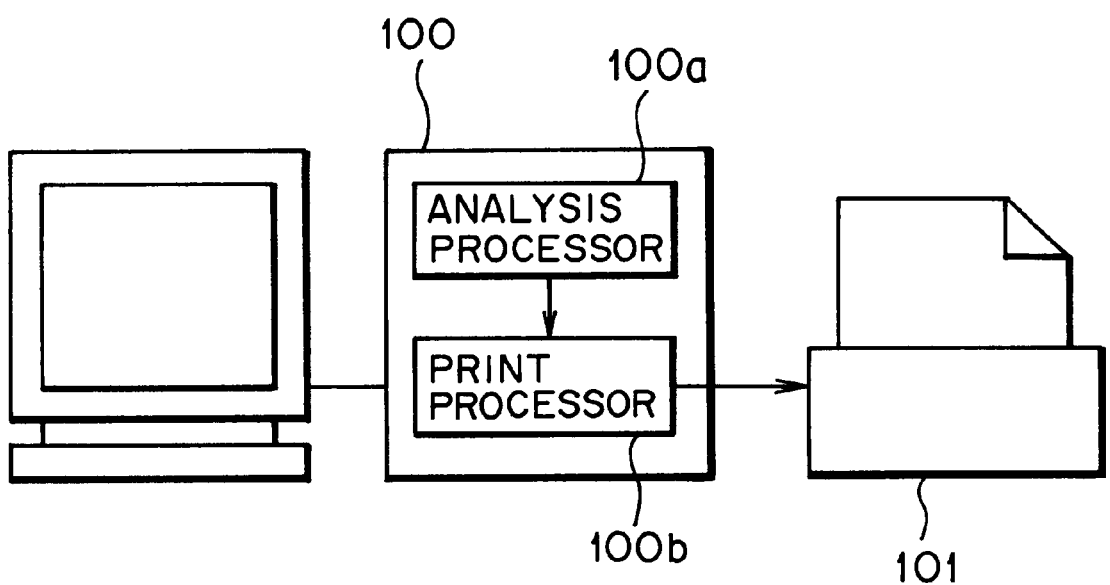
FIG. 10 is a block diagram for explaining a general (stand-alone type) method of printing image data by a processor.

On the other hand, as shown in FIG. 9, the print processor 11a initially receives the intermediate data from the LAN 20, or reads the intermediate data from the recording medium such as hard disk 30, and FPD 40 (Step S41), thereby obtaining parallel movement elements (tx, ty) of the transformation matrix as the coordinates of the print start position (Step S42).

As shown in FIG. 6, the print processor 11a obtains positions of four vertexes A (tx, ty), B (tx+c, ty+d), C (tx+c+a, ty+d+b), and D (tx+a, ty+b) of one pixel depending upon the matrix elements a to d, tx, and ty of the transformation matrix (Step S43). Further, the print processor 11a reads the color data (CMYK) corresponding to the pixel from the intermediate data (Step S44), and writes the color data obtained in Step S24 onto the print area (bit map memory) in a rectangular area having the vertexes obtained in Step S23 (Step S45).

It is decided whether or not the pixel whose color data has been written is the last pixel (the 512th pixel) in a row being processed (Step S46). If not the last pixel (in the case of NO), the operation returns to Step S43 to repeatedly perform the same processing.

However, in order to find positions of four vertexes A, B, C, and D of the nth pixel (n=2 to 512) in Step S43, two vertexes C and D of the (n−1)th pixel obtained in the preceding processing are respectively replaced by the two vertexes A and B of the nth pixel serving as a candidate for the current processing, thereafter calculating the remaining two vertexes C, D of the nth pixel.

According to the above procedure, the 512 color data in the single row are written onto the print area (bit map memory) in the x direction from the coordinates (tx, ty) in the order in which the pixels are arranged.

If it is decided in Step S46 that the pixel whose color data has been written is the last pixel in the row being processed (in the case of YES), it is decided depending upon the count value of data whether or not all the pixels (in all the rows) are completely processed (Step S47). If completely processed (in the case of YES), the operation is ended. Otherwise, if not completely processed (in the case of NO), the operation proceeds to obtain a print start position of the next row (Step S48), thereafter returning to Step S43 to repeatedly perform the same processing. In Step S48, a print start position in the mth row (m=2 to 512) is obtained as a vertex B of the first pixel in the (m−1)th row.

As set forth above, according to the second embodiment of the present invention, it is possible to provide the same effects as those in the first embodiment.

[D] Others

It must be noted that the present invention should not be limited to the embodiments described above, and many changes and variations may be made without departing from the spirit or scope of the following claims.

What is claimed is:

1. An image data transfer method of transferring image data analyzed by an analysis processor from the analysis processor to a print processor which performs print processing of the image data to cause a printer to print the image data, the method comprising:

creating, in the analysis processor, image analysis intermediate data containing matrix elements, which comprise scale factors, rotation elements and parallel movement elements, of transformation matrix for transformation of a position of each pixel of the image data into an actual printing position, and color information of the pixels arranged in the order in which the pixels of the image data are arranged; and transferring the image analysis intermediate data created in the analysis processor as the image data to the print processor.

2. An image data transfer method according to claim 1, wherein the print processor finds, in the order in which the pixels of the image data are arranged, a print area of each pixel of the image data depending upon the matrix elements of the transformation matrix in the image analysis intermediate data, and reads the color information of each pixel from the image analysis intermediate data to write the color information onto the print area.

3. An image data transfer method according to claim 1, wherein the analysis processor adds to the image analysis intermediate data a format of the color information as sample format information, and the print processor performs print processing according to the sample format information in the image analysis intermediate data.

4. An image data transfer method according to claim 2, wherein the analysis processor adds to the image analysis intermediate data the number of pixels per row of the image data, and the number of color information contained in the image analysis intermediate data, and the print processor performs pixel loading processing by one row and calculation processing of a print start position of the next row depending upon the number of pixels per row in the image analysis intermediate data, and repeatedly performs the pixel loading processing and the calculation processing according to the number of color information in the image analysis intermediate data.

5. An image data transfer method according to claim 1, wherein the image analysis intermediate data created in the analysis processor is stored on a machine readable recording medium to be transferred to the print processor.

6. An image data transfer method according to claim 1, wherein the image analysis intermediate data created in the analysis processor is transferred to the print processor over a communication network.

7. A machine readable recording medium on which, for transferring image data analyzed by an analysis processor from the analysis processor to a print processor which performs print processing of the image data to cause a printer to print the image data, image analysis intermediate data created from the image data in the analysis processor is recorded, the machine readable recording medium with the image analysis intermediate data recorded therein, wherein:

the image analysis intermediate data is recorded on a data file created on the recording medium;

the data file has a matrix element data area containing matrix elements, which comprise scale factors, rotation elements and parallel movement elements, of a transformation matrix for transformation of a position of each pixel of the image data into an actual printing position in the print processor, and a color data area containing color information to be written on a print area of each pixel of the image data in the print processor; and the color information of the pixels of the image data are arranged in the color data area in the order in which the pixels of the image data are arranged.

8. A machine readable recording medium with image analysis intermediate data recorded thereon according to claim 7, wherein the data file has a format data area containing sample format information used for posting a format of the color information to the print processor.

9. A machine readable recording medium with image analysis intermediate data recorded thereon according to claim 7, wherein the data file has:

a row pixel number data area containing the number of pixels per row of the image data, required to perform pixel loading processing by one row and calculation processing of a print start position of the next row in the print processor; and a count value data area in which the number of color information contained in the image analysis intermediate data is recorded to define the number of times the pixel loading processing and the calculation processing are repeated in the print processor.

10. A machine readable recording medium with image analysis intermediate data recorded thereon according to claim 8, wherein the data file has:

a row pixel number data area containing the number of pixels per row of the image data, required to perform pixel loading processing by one row and calculation processing of a print start position of the next row in the print processor; and a count value data area in which the number of color information contained in the image analysis intermediate data is recorded to define the number of times the pixel loading processing and the calculation processing are repeated in the print processor.

11. A method to transfer image data between an image analysis processor and an image print processor, the method comprising:

creating, in an image analysis processor, an intermediate image information according to pixel arrangement of an image, the intermediate image information used to sequentially calculate a position of a pixel using information of an adjacent pixel to transform a position of each pixel of the image into an actual printing position and to determine color information of each pixel; and transferring the intermediate image information to an image print processor.

* * * * *